2,806,035
Patented Sept. 10, 1957

2,806,035
BENZTRIAZOLE DERIVATIVES

Alfred Margot and Hans Gysin, Basel, Switzerland, assignors to J. R. Geigy A.-G., Basel, Switzerland, a Swiss firm No Drawing. Application April 26, 1956, Serial No. 580,698

Claims priority, application Switzerland June 17, 1955

5 Claims. (Cl. 260—308)

The present invention is concerned with new benztriazole derivatives and the production thereof as well as with fungicidal agents which contain such compounds and their use for the control of fungi.

It has surprisingly been found that new benztriazole derivatives which have excellent fungicidal properties are obtained if trichloromethane sulphenyl chloride (perchloromethylmercaptan) is reacted in the presence of an acid binding agent with a benztriazole of the general formula:

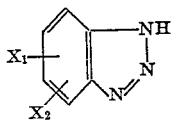

wherein $X_1$ represents a halogen atom or a nitro group, and $X_2$ represents hydrogen, a halogen atom or a nitro group.

The reaction products obtained correspond to the general formula:

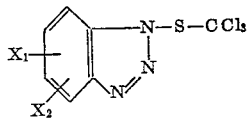

II

As they are not phytotoxic in the concentrations necessary to attain a fungicidal action and are only slightly toxic to warm blooded animals, they are excellently suitable as active ingredients for fungicidal agents, in particular for use in plant protection.

The reaction defined above can be performed for example in a two-phase system by dissolving the substituted benztriazole in diluted caustic soda lye, adding chloroform or another organic solvent which is insoluble in water and either adding dropwise or pouring in perchloromethylmercaptan while stirring vigorously.

Examples of substituted benztriazoles are 5-chlorobenztriazole, 5-bromobenztriazole, 4-nitrobenztriazole, 5-nitrobenztriazole, 4.6-dinitrobenztriazole and 4-nitro-5-chlorobenztriazole.

The following examples further illustrate the production of the new benztriazole derivatives. Parts are given as parts by weight and their relationship to parts by volume is as that of grammes to cubic centimetres. The temperatures are in degrees centigrade.

Example 1

15.3 parts of 5-chlorobenztriazole are dissolved in 100 parts by volume of N-caustic soda lye and 60 parts by volume of chloroform are added. 19 parts of perchloromethylmercaptan are added dropwise while stirring strongly at about 20° to this mixture and the whole is stirred for some hours at room temperature. The two clear layers are then separated, the organic layer is washed with water and the solvent is evaporated off, with advantage finally in the vacuum. Over a 90% yield of a mixture of the two isomeric 1-trichloromethane sulphenyl-5-chlorobenztriazole and 1-trichloromethane sulphenyl-6-chlorobenztriazole is obtained. The product is a brownish mass of a honey-like consistency which gradually crystallises on standing. It can be distilled in a high vacuum at 135° under 0.2 mm. pressure. The isomer which is more difficultly soluble can be isolated in pure form by recrystallisation from petroleum ether. It melts at 80–81°.

Example 2

19 parts of perchloromethylmercaptan are added dropwise while stirring at about 20° to a mixture of 16.4 parts of 4-nitrobenztriazole, 100 parts by volume of N-caustic soda lye and 100 parts by volume of chloroform. The whole is stirred for several hours at room temperature, the organic layer is separated, washed several times with water and the greater part of the chloroform is distilled off. The 1-trichloromethane sulphenyl-4(7)-nitrobenztriazole which precipitates in crystalline form can be further purified by recrystallisation from chloroform whereupon it then melts at 139–140°.

1-trichloromethane sulphenyl-4-nitro-5-chlorobenztriazole is obtained in an analogous manner. It melts at 130–131°.

The new benztriazole derivatives can be used in finely distributable form as such or combined with suitable carriers and distributing agents for the protection of plants and parts thereof from attack by injurious fungi. They are also suitable, however, for the treatment of organic materials such as, e. g. wood, textile, hides and leather. They can also be used in combination with other suitable organic and inorganic, fungicidal or insecticidal substances.

For example the new active ingredients can be combined with solid pulverulent carriers such as, e. g. talc, kaolin, bole, bentonite, chalk or ground limestone. The pulverulent fungicides obtained can be made suspendable in water if desired by the addition of suitable wetting and dispersing agents. Also the active ingredients can be suspended in water as such in solid finely ground form with the aid of capillary active substances, or, after being dissolved in organic solvents, they can be emulsified in water with the aid of suitable emulsifiers. Further, the active ingredients can be dissolved in organic solvents, e. g. in chlorinated hydrocarbons such as trichlorethylene, or in medium petroleum fractions, possibly with the addition of auxiliary solvents such as acetone or higher ketones. Finally the active ingredients can be dispersed in the air in the form of aerosols, smoke or mist, in particular in store rooms or greenhouses.

Example 3

2–5 parts of active ingredient, e. g. 1-trichloromethane sulphenyl-4(5)-nitrobenztriazole or 1-trichloromethane sulphenyl-4.6-dinitrobenztriazole are finely ground with 98–95 parts of talc. The dust so obtained can be used for example for the disinfection of bedding earth as well as for dusting plants or parts thereof such as bulbs and tubers.

If the amount of active ingredient is increased to 15 parts and some adhesive is added, then a strongly fungicidal dry seed dressing agent is obtained which at the same times does not affect germination.

Example 4

By grinding together 10 parts of 1-trichloromethane sulphenyl-5(6)-nitrobenztriazole and 82 parts of kaolin or chalk and mixing with 8 parts of wetting and dispersing agents, e. g. ethylene oxide condensation products of alkyl phenols, a concentrate is obtained which, on mixing with water, produces a fungicidal spraying agent which is excellently suitable for the treatment of parts of plants above the ground.

Example 5

20 parts of the isomeric mixture of 1-trichloromethane sulphenyl-5-chlorobenztriazole and 1-trichloromethane sulphenyl-6-chlorobenztriazole, 50 parts of xylene and 30 parts of ethylene oxide condensation products of alkyl phenols are mixed together to obtain an emulsion concentrate which can be used for the preparation of emulsions in plant protection.

A concentrate for the production of less strongly wetting emulsions is obtained by mixing 25 parts of active ingredient, 67 parts of xylene and 8 parts of ethylene oxide condensation products.

Example 6

Celery plants are sprayed during growth with a wettable powder containing 0.1% of 1-trichloromethane sulphenyl-5-chlorobenztriazole as active ingredient. They are protected from attack by celery leaf spot (Septoria apii) to a sufficient degree whilst untreated plants growing by the side of those treated are strongly atttacked and on being gathered show on the average a slighter weight of the edible parts.

What we claim is:

1. A benztriazole corresponding to the formula:

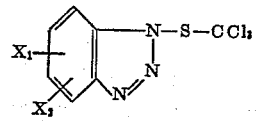

wherein
$X_1$ represents a member selected from the group consisting of a halogen atom and a nitro group, and
$X_2$ represents a member selected from the group consisting of hydrogen, a halogen atom and a nitro group.

2. 1-trichloromethane sulphenyl-5-chlorobenztriazole.
3. 1-trichloromethane sulphenyl-6-chlorobenztriazole.
4. 1-trichloromethane-sulphenyl-4(5)-nitrobenztrialzole.
5. 1-trichloromethane sulphenyl-4-nitro-5-chlorobenztriazole.

No references cited.